Dec. 12, 1967  S. O. TAYLOR  3,357,294
FASTENING DEVICES
Filed Dec. 8, 1965
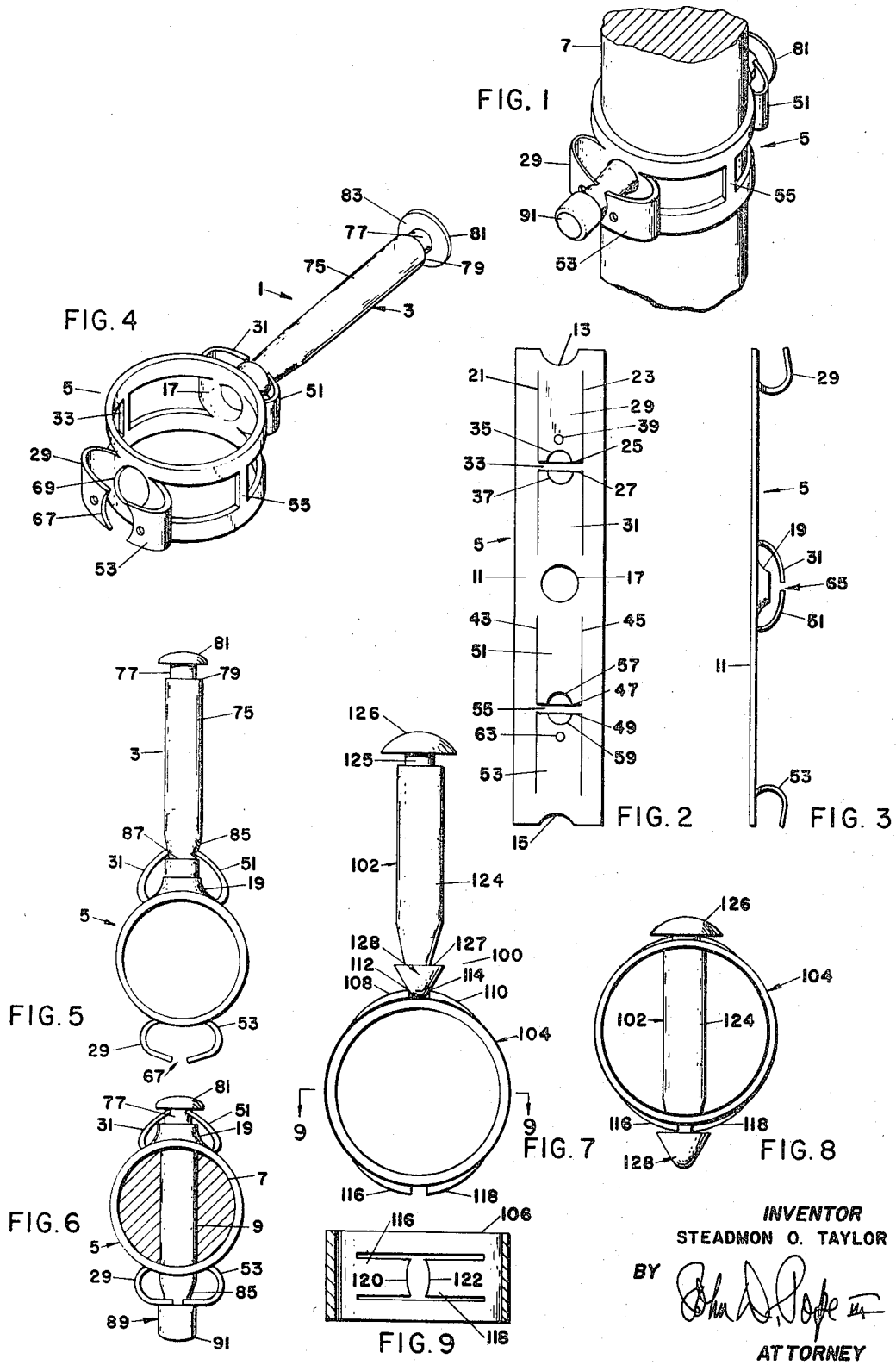
INVENTOR
STEADMON O. TAYLOR
BY
ATTORNEY

United States Patent Office 3,357,294
Patented Dec. 12, 1967

3,357,294
FASTENING DEVICES
Steadmon O. Taylor, Fort Lauderdale, Fla., assignor to Inventions and Invention Consultants, Inc., Chicago, Ill., a corporation of Illinois
Filed Dec. 8, 1965, Ser. No. 512,370
12 Claims. (Cl. 85—36)

ABSTRACT OF THE DISCLOSURE

A fastening device including a lock-ring adapted to encircle a rod-like member. The lock-ring is slit in the formation of opposed pairs of integral tabs, each pair having opposed arcuate end margins. A pin having diametrally reduced portions fits through the lock-ring and rod-like member and is retentively held in place by the tabs which spring into the diametrally reduced portions.

---

This invention relates in general to certain new and useful improvements in fastening devices and, more particularly, to lock-ring and pin assemblies.

Many machines of current manufacture employ pins in one way or another for holding the various elements thereof together in operative relationship.

However, unless some method is provided for holding the pin in the particular hole into which it is inserted, the possibility always exists that it will work loose through vibrations or other unauthorized forces. Various methods have been employed for retentively engaging the pin and holding it in place, but such methods generally involve complicated structures or else do not possess sufficient strength to resist such forces. As a result, the employment of pins in machinery and other devices has been severely limited.

Among the several objects of the present invention may be noted the provision of a fastening device having a lock-ring and a pin which cooperate in such a manner so as to preclude unauthorized removal of the pin from a structure into which it is fitted; the provision of a fastening device of the type stated which is rugged in construction and easy to install; and the provision of a fastening device of the type stated which is simple in construction and economical to manufacture. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated.

FIG. 1 is a perspective view of a fastening device constructed in accordance with and embodying the present invention, the fastening device being in operative engagement with a cylindrical structure;

FIG. 2 is a plan view of a blank from which the lock-ring forming part of the present invention may be formed;

FIG. 3 is a side elevational view of the blank;

FIG. 4 is a perspective view showing the lock-ring in retentive engagement with the pin prior to installation;

FIG. 5 is an elevational view showing the lock-ring in retentive engagement with the pin prior to insertion;

FIG. 6 is an elevational view showing the pin fully inserted through the cylindrical structure and lock-ring;

FIG. 7 is an elevational view of a modified form of fastening device constructed in accordance with and embodying the present invention and showing the pin prior to insertion in the lock-ring;

FIG. 8 is an elevational view of the modified form of fastening device showing the pin fully inserted within the lock-ring; and FIG. 9 is a sectional view taken along line 9—9 of FIG. 7.

Corresponding reference characters indicate corresponding parts throughout the several views of the drawings.

Referring now in more detail and by reference characters to the drawings, which illustrate practical embodiments of the present invention, 1 designates a fastening device including a pin 3 and a lock-ring 5 which cooperate to hold the pin 3 within a cylindrical structure 7 having a diametrally extending hole 9.

Referring now to FIG. 2, the lock-ring 5 is preferably formed from a rectangular blank 11 of spring steel, brass, or some other suitable metal possessing sufficient strength and resiliency and having a length slightly greater than the circumference of the cylindrical structure 7. However, from the following discussion, it will be obvious to one skilled in the art that the lock-ring 5 can also be formed from a tubular member if desired. At its ends, the blank 11 is stamped or otherwise cut away in the formation of radially equal semi-circular cut-outs 13, 15, while at its center it is provided with a circular aperture 17 of slightly reduced radius which is formed in an outwardly flanged frusto-conical protuberance 19.

Intermediate the aperture 17 and cut-out 13, the blank 11 is stamped in the provision of two sets of spaced parallel slits 21, 23, which are respectively connected by transversely extending slits 25, 27, in the formation of tabs 29, 31, and an intermediate connecting portion 33. The ends of the tabs 29, 31, adjacent the connecting portion 33 are cut away in the provision of arcuate cut-outs 35, 37, respectively, which are somewhat reduced in radius when compared to the cut-outs 13, 15, and aperture 17. Immediately outwardly from the cut-out 35, the tab 29 is centrally provided with a small circular aperture 39 for purposes presently more fully appearing.

Intermediate the aperture 17 and cut-out 15, the blank 11 is similarly provided with pairs of spaced parallel slits 43, 45, transversely connected by slits 47, 49, in the formation of tabs 51, 53, and an intermediate portion 55, the tabs 51, 53, being further provided with radially reduced arcuate cut-outs 57, 59. Outwardly from the arcuate cut-out 59, the tab 53 is provided with a small circular aperture 63.

To transform the blank 11 into the lock-ring 5, the tabs 31, 51, are upturned and brought into overlying relation with the frusto-conical protuberance 19 so that the arcuate cut-outs 37, 57, define an outwardly presented split circular aperture 65 which is axially aligned with, but diametrally reduced from, the aperture 17. The tabs 29, 53, are similarly upturned and presented in overlying relation to the semi-circular cut-outs 13, 15, respectively, all as best seen in FIG. 3. Thereafter, the blank 11 is bent inwardly away from the upturned tabs 31, 51, and into a cylindrical configuration having an internal diameter slightly larger than the cylindrical structure 7. The ends of the blank 11 are brought into endwise abutment and welded, brazed or otherwise suitably joined together on each side of the cut-outs 13, 15. In this configuration, the ends of the upturned tabs 29, 53, are in close proximity and the arcuate cut-outs 35, 59, therein define a split circular aperture 67 which is diametrally reduced from and in outward axial registration with an aperture 69 defined by the semi-circular cut-outs 13, 15.

The pin 3 is formed from a relatively hard steel and integrally includes a cylindrical shank 75 which is sized for slidable insertion through the aperture 17 as well as the hole 9 in the cylindrical structure 7. At its one end, the shank 75 is turned down in the provision of a diametrally reduced portion 77 which inwardly terminates at a shoulder 79 and is provided at its outer end with a diametrally enlarged head 81 having a substantially planar underface 83. At its other end, the shank 75 is tapered downwardly in the provision of a tapered section 85 which terminates at an outwardly flanged shoulder 87 forming part of an end portion 89 which is diametrally equivalent to the shank 75 and is rounded off at its outer end in the provision of a gently contoured end surface 91.

The final step of the manufacturing operation involves pressing the end portion 89 through the split aperture 65 which is slightly opened, that is to say the upturned tabs 31, 51, are spread somewhat apart by the gently contoured end surface 91 and side face of the end portion 89. Forward progression of the pin 3 is terminated immediately after the shoulder 79 passes the upturned tabs 31, 51, whereupon the tabs 31, 51, spring inwardly and the semi-circular margins of the cut-outs 27, 57, engage the tapered section 85, retentively holding the pin 3 in place. It should be noted that the end portion 89 is of such a length that it extends into the aperture 17 of the frusto-conical protuberance 19, but does not project beyond the cylindrical inner surface of the lock-ring 5. Thus, the pin 3 is held in an upstanding radially outwardly projecting position prior to use.

In use, the lock-ring 5 is fitted over the cylindrical structure 7 until the split apertures 65, 67, and apertures 17, 69, come into registration with the diametrally extending hole 9. The pin 3 is then pressed slightly inwardly into the hole 9 so as to achieve correct alignment whereupon the head 81 is struck with a hammer or other suitable tool until the planar underface 83 comes into abutment with the upturned tabs 31, 51, as best seen in FIG. 6. As the pin 3 advances, the tapered section 85 will, of course, spread the upturned flanges 31, 51, outwardly causing the arcuate cut-outs 37, 57, thereof to ride up onto the shank 75. Further advancement of the pin 3 brings the upturned tabs 31, 51, to the shoulder 79, at which point they spring inwardly and the arcuate cut-outs 37, 57, engage the surface of the diametrally reduced portion 77 so as to prevent outward removal of the pin 3. Simultaneously, the gently contoured end surface 91 passes through the aperture 69 and thereafter into engagement with the margins of the arcuate cut-outs 35, 59, spreading the tabs 29, 53, outwardly as they ride over the surface of the end portion 89. The pin 3 should be of such a length that when the planar underface 83 of the head 81 engages the outwardly presented surface of the tabs 31, 51, the shoulder 87 will have passed by the upturned tabs 29, 53, allowing the same to spring inwardly so that the margins of the arcuate cut-outs 35, 59, engage the surface of the tapered section 85 immediately inwardly from the shoulder 87, thus providing an additional lock to retard withdrawal of the pin 3. Furthermore, when the pin 3 is fully inserted the end of the shank 75 immediately inwardly from the tapered section 85 will be presented within the confines of the aperture 67 so as to prevent any wobble or side play of the pin 3 with respect to the lock-ring 5 once the former is fully inserted within the latter.

To remove the pin 3 from the lock-ring 5, a nail or other pointed object is inserted into the small apertures 39, 63, formed in the tabs 29, 53, and pressed outwardly so as to pry the particular tabs apart. Contemporaneously the end portion 89 is pressed toward the cylindrical structure 7 and between the arcuate cut-outs 35, 59, at which time the tabs 29, 63, are released and the cut-outs 35, 59, allowed to engage the end portion 89. Inasmuch as the axial length of the diametrally reduced portion 77 is somewhat greater than the thickness of the tabs 31, 51, a slight axial movement of the pin 3 is possible once the tabs 29, 53, have been spread. Thereafter, the end portion 89 is struck sharply with a hammer and driven toward the upturned tabs 31, 51, thereby causing the margins of the arcuate cutouts to ride up over the shoulder 79 and onto the shank 75. At this stage of removal, the shoulder 79 no longer serves as an impediment and further withdrawal of the pin 3 is possible, preferably by use of a drift pin and hammer.

The pin 3 is obviously easy to install and requires no specialized equipment for insertion. Moreover, once it is completely driven into the lock-ring 5, the tabs 31, 51, and 29, 53, engage the diametrally reduced portion 77 and tapered section 85, respectively, of the pin 3 and prevent withdrawal of it through vibrations and other unauthorized forces. The lock-ring 5, in effect, engages the pin 3 at both ends and thus provides double insurance against unauthorized removal. Furthermore, if desired, the pin 3 can be easily removed by bending the tabs 29, 31, and 51, 53, outwardly as heretofore described.

Referring now to FIGS. 7 through 9, it is possible to provide a modified fastening device 100 which is very similar to the fastening device 1 and includes a pin 102 and a lock-ring 104, the latter of which can be fabricated from an elongated rectangular blank or from a cylindrical tubular member. The lock-ring 104 includes a cylindrical tubular body 106 which is cut away in the provision of slightly outwardly bent tabs 108, 110, the opposed ends of which are further relieved so as to form opposed arcuate cut-outs 112, 114, respectively. Diametrally opposite the tabs 108, 110, the body 106 is similarly cut away in the provision of outwardly bent tabs 116, 118, having ends provided with opposed arcuate cut-outs 120, 122, respectively.

The pin 102 integrally includes a cylindrical shank 124 which is turned down at one end in the provision of a diametrally reduced portion 125 which outwardly terminates at an enlarged head 126. At its other end, the shank 124 is tapered downwardly to a shoulder 127 which forms part of a tapered end portion 128.

The fastening device 100 is installed on the cylindrical structure 7 by passing the lock-ring 104 over the structure 7 until the two axially aligned split apertures formed by the arcuate cut-outs 112, 114, and 120, 122, align with the diametrally extending hole 9.

Thereafter, the tapered end portion 128 of the pin 3 is placed between the arcuate cut-outs 112, 114, and the pin 3 is driven axially through the hole 9 and toward the split aperture formed by the cut-outs 120, 122. Upon further advancement the end portion 128 engages the arcuate cut-outs 120, 122, and forces the tabs 116, 118, apart over the tapered surface of the end portion 128. When the pin 102 is fully inserted within the lock-ring 104, as illustrated in FIG. 9, the margins of the arcuate cut-outs 112, 114, will engage the surface of the diametrally reduced portion 125 between the head 126 and shank 124, while the margins of the arcuate cut-outs 116, 118, will grip the tapered end of the shank immediately inwardly from the shoulder 127, thereby affording double protection against unauthorized removal of the pin 102.

Inasmuch as the fastening device 100 is not provided with upturned tabs, it is somewhat more compact than the fastening device 1, but the lack of such upturned tabs makes it considerably more difficult to remove the pin 102 after it is once inserted.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A fastening device comprising a lock-ring having a tubular body which is cut away in the formation of first and second opposed tabs and third and fourth opposed tabs, the first and second tabs having closely spaced ends provided with opposed arcuate cut-outs which define a first split aperture, the third and fourth tabs having closely spaced ends provided with opposed arcuate cut-outs which define a second split aperture; and a pin having a shank greater in transverse width than the first split aperture, the pin having a head and a diametrally reduced portion immediately inwardly from the head at its one end and an end portion at its opposite end, which end portion inwardly terminates at a shoulder; the first and second tabs being adapted to ride over the shank when the pin is inserted through the first split aperture and to spring into the diametrally reduced portion so as to prevent unauthorized removal of the pin, the third and fourth tabs being adapted to spring inwardly beyond the shoulder so that the arcuate margins thereof engage the shank immediately inwardly from the shoulder when the pin is fully inserted, whereby to further prevent unauthorized removal of the pin from the lock-ring.

2. A fastening device according to claim 1 in which the shank is tapered up to the shoulder, the margins of the third and fourth arcuate cut-outs engaging the tapered portion of the shank immediately inwardly from the shoulder when the pin is fully inserted.

3. A fastening device according to claim 1 in which the end portion of the pin is provided with a gently contoured surface for forcing the first and second and third and fourth tabs apart when advanced through the first and second split apertures, respectively.

4. A fastening device according to claim 1 in which the lock-ring possesses a tubular cylindrical configuration and the first and second split apertures are diametrally opposed.

5. A fastening device according to claim 1 in which the tabs are formed from spaced parallel slit marks cut into the tubular body.

6. A fastening device according to claim 1 in which the end portion is diametrally smaller than the shank.

7. A fastening device according to claim 1 in which the tabs are upturned so that the arcuate cut-outs are presented in outwardly spaced relation to the tubular body.

8. A lock-ring device according to claim 7 in which the third and fourth tabs are provided with small apertures in close proximity to the third and fourth arcuate cut-outs for reception of a pointed object which can be used to pry the third and fourth tabs apart so that the pin can optionally be withdrawn from the lock-ring.

9. A fastening device according to claim 7 in which the body is provided with first and second circular apertures in axial registration with the first and second split apertures.

10. A fastening device according to claim 9 in which the axial length of the tapered portion does not exceed the distance between the second split aperture and the second aperture whereby to preclude wobble of the pin when the pin is fully inserted in the lock-ring.

11. A fastening device according to claim 9 in which the tubular body is provided with an outwardly projecting frusto-conical protuberance in surrounding relation to the first aperture, the first split aperture being presented in outwardly spaced overlying relation to the protuberance.

12. A fastening device according to claim 11 in which the axial length of the end portion is slightly less than the distance between first circular aperture and the inner surface of the body portion whereby prior to installation the end portion is embraced by the walls of the frusto-conical protuberance and the shank is engaged immediately inwardly from the shoulder by the margins of the first and second cut-outs so that the lock-ring carries the pin in outwardly projecting relation thereto.

References Cited

UNITED STATES PATENTS

| | | | |
|---|---|---|---|
| 2,667,675 | 2/1954 | Brutti | 85—8.8 |
| 2,745,620 | 5/1956 | Murphy | 85—36 |
| 3,174,384 | 3/1965 | Vanni | 85—36 |
| 3,261,357 | 7/1966 | Roberts et al. | 85—36 |

FOREIGN PATENTS 267,725   3/1927   Great Britain.

CARL W. TOMLIN, *Primary Examiner.*

M. PARSONS, JR., *Examiner.*